United States Patent
Bruhn et al.

(10) Patent No.: US 8,201,577 B2
(45) Date of Patent: Jun. 19, 2012

(54) FEEDING ARRANGEMENT FOR A LIQUID ADDITIVE FOR AN INTERNAL-COMBUSTION-ENGINE

(75) Inventors: Andreas Bruhn, Puchheim (DE); Jonas Wachter, Hallbeergmoos (DE); Udo Strathoff, Munich (DE); Guenther Schneider, Schiltberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 146 days.

(21) Appl. No.: 12/533,183

(22) Filed: Jul. 31, 2009

(65) Prior Publication Data

US 2010/0024402 A1    Feb. 4, 2010

Related U.S. Application Data

(63) Continuation of application No. PCT/EP2008/000621, filed on Jan. 26, 2008.

(30) Foreign Application Priority Data

Feb. 1, 2007 (DE) .................. 10 2007 005 004

(51) Int. Cl.
*F17D 1/17* (2006.01)
*F17D 3/18* (2006.01)
*F17N 3/02* (2006.01)
*F01N 3/08* (2006.01)
*F02B 47/04* (2006.01)

(52) U.S. Cl. ........ 137/571; 137/341; 137/558; 137/563; 60/282; 60/317; 123/1 A; 123/198 A

(58) Field of Classification Search ............... 137/341, 137/563, 565.01, 571, 572; 60/282, 317; 123/1 A, 198 A, 698
See application file for complete search history.

(56) References Cited

U.S. PATENT DOCUMENTS

| | | | | |
|---|---|---|---|---|
| 4,409,931 A * | 10/1983 | Lindberg | ............. | 123/25 R |
| 5,099,955 A * | 3/1992 | Mangen et al. | ......... | 184/7.4 |
| 6,230,698 B1 | 5/2001 | Shaw | | |
| 6,273,120 B1 * | 8/2001 | Hofmann et al. | ........ | 137/98 |
| 6,550,250 B2 * | 4/2003 | Mikkelsen et al. | ...... | 60/685 |
| 6,878,359 B1 * | 4/2005 | Mathes et al. | ........ | 423/239.1 |

FOREIGN PATENT DOCUMENTS

DE    32 30 608 A1    2/1984

(Continued)

OTHER PUBLICATIONS

German Search Report dated Aug. 28, 2007 including partial English translation (Nine (9) pages).

(Continued)

Primary Examiner — John Rivell
Assistant Examiner — Jonathan Waddy
(74) Attorney, Agent, or Firm — Crowell & Moring LLP

(57) ABSTRACT

An arrangement is provided for feeding a liquid additive from a receptacle into a fuel pipe or into an exhaust line of an internal-combustion engine of a motor vehicle. The receptacle is fillable with additive from a larger storage tank that is also accommodated in the motor vehicle by way of a connection line that can be blocked by a shut-off element. A pump is installed in the receptacle or in the connection line. A heating device for heating at least a partial volume of the additive is present in the receptacle. A blockable return line branches off into the receptacle from the connection line between the pump and the shut-off element.

14 Claims, 1 Drawing Sheet

FOREIGN PATENT DOCUMENTS

| | | |
|---|---|---|
| DE | 102 29 483 A1 | 3/2004 |
| DE | 103 36 296 A1 | 2/2005 |
| EP | 0 928 884 A2 | 7/1999 |
| WO | WO 03/029640 A1 | 4/2003 |
| WO | WO 2004/003371 A1 | 1/2004 |
| WO | WO 2006/064028 A1 | 6/2006 |

OTHER PUBLICATIONS

International Search Report dated Jun. 2, 2008 including English translation (Six (6) pages).

* cited by examiner

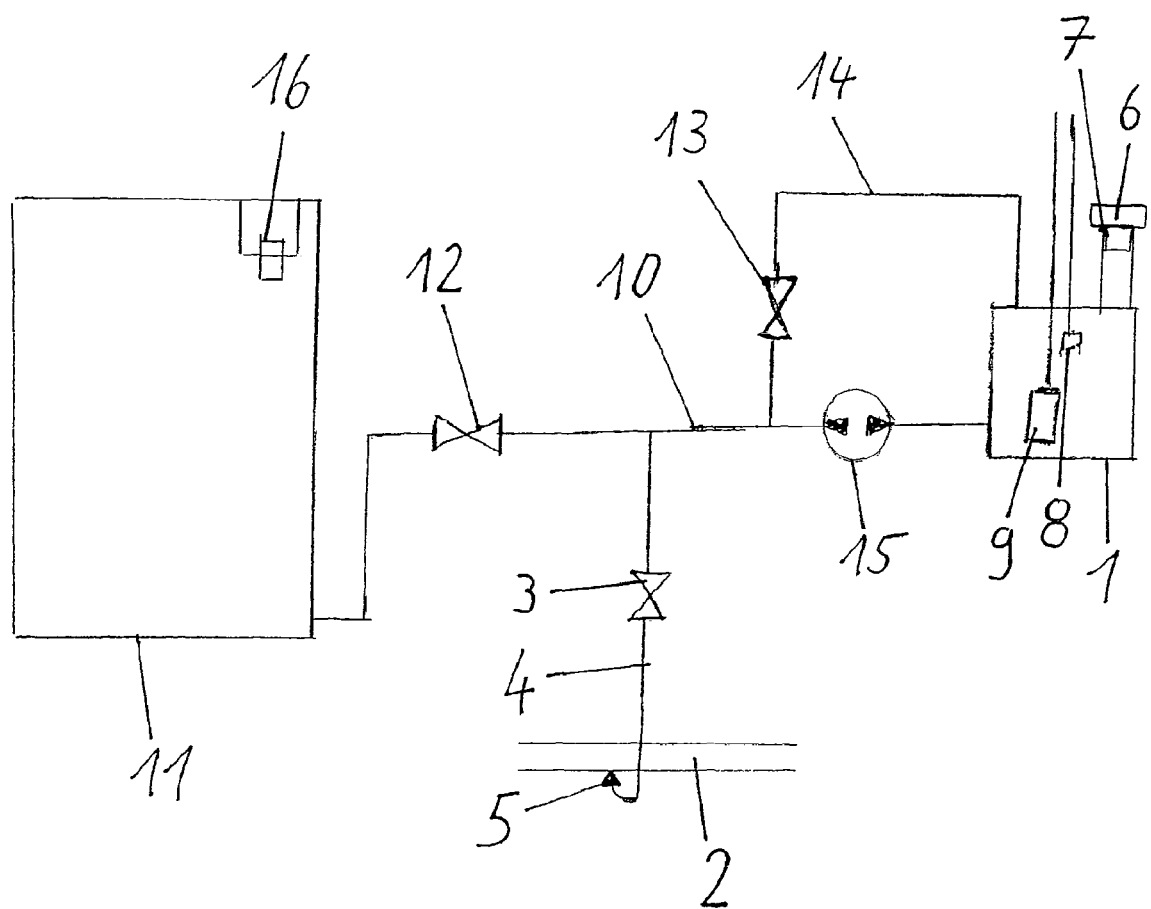

US 8,201,577 B2

FEEDING ARRANGEMENT FOR A LIQUID ADDITIVE FOR AN INTERNAL-COMBUSTION-ENGINE

CROSS-REFERENCE TO RELATED APPLICATIONS

This application is a continuation of PCT International Application No. PCT/EP2008/000621, filed Jan. 26, 2008, which claims priority under 35 U.S.C. §119 to German Patent Application No. DE 10 2007 005 004.8, filed Feb. 1, 2007, the entire disclosures of which are herein expressly incorporated by reference.

This application contains subject matter related to U.S. application Ser. No. 12/533,250, entitled "Arrangement for Feeding a Liquid Additive for an Internal-Combustion Engine," filed on even date herewith.

BACKGROUND AND SUMMARY OF THE INVENTION

The invention relates to an arrangement for feeding a liquid additive from a receptacle into a fuel line or into an exhaust pipe of an internal-combustion engine of a motor vehicle by way of a pump. The receptacle is fillable with additive from a larger storage tank also accommodated in the motor vehicle by way of a connection line that can be blocked by a shut-off element.

In the case of internal-combustion engines, particularly in the case of Diesel engines, it is known to feed an additive to the fuel or to the exhaust gas, which additive contributes to the emission control. Such an additive can, for example, lower the ignition temperatures for soot particles for their burning and can be used for soot filter cleaning in the exhaust system. German patent document DE 102 29 483 A1 describes this state of the art. For a more precise apportioning of the additive, an additive pre-volume is formed here in a receptacle separate from the additive tank. This additive pre-volume is fed in an apportioned manner to the fuel line by use of a sucking jet pump.

It is an object of the invention to construct an arrangement for feeding a liquid additive from a receptacle into a fuel line or into an exhaust pipe of an internal-combustion engine such that an operation is ensured under all operating conditions that has as few problems and is as reliable as possible, and the structure of the arrangement is uncomplicated.

This object is achieved by an arrangement for feeding a liquid additive from a receptacle into a fuel line or into an exhaust pipe of an internal-combustion engine of a motor vehicle by way of a pump. The receptacle is fillable with additive from a larger storage tank also accommodated in the motor vehicle by way of a connection line that can be blocked by a shut-off element. The pump is installed in the receptacle or in the connection line. A heating device for heating at least a partial volume of the additive is present in the receptacle. A closeable return flow line branches-off into the receptacle from the connection line between the pump and the shut-off element. Additional further developments of the invention are described herein.

According to the invention, an arrangement is provided for feeding a liquid additive from a receptacle into a fuel line or into an exhaust pipe of an internal-combustion engine of a motor vehicle by way of a pump. The receptacle is fillable with additive from a larger storage tank also accommodated in the motor vehicle by way of a connection line that can be blocked by a shut-off element. The pump is installed in the receptacle or in the connection line. A heating device for heating at least a partial volume of the additive is present in the receptacle. A closeable return flow line branches-off into the receptacle from the connection line between the pump and the shut-off element.

As a result, a lasting heating concept is implemented, which is necessary because, for example, a 32.5% urea solution as the additive would freeze at approximately minus 11 degrees centigrade. In the receptacle provided with a volume of from 5 to 8 liters, the heating element will first melt a kind of cavity-type hole into the frozen urea solution. As soon as sufficient molten additive is then available, warm additive can be delivered by means of the pump by way of the return line onto the surface of the frozen additive in the receptacle, which additive will thereby be melted off from the upward direction. For this reason, it is advantageous for the connection line to end in the proximity of the heating device, particularly in the bottom area of the receptacle and, for the return line to end at the top in the receptacle. Thus, by way of the return line and the receptacle, an additive circulation can take place, which assists the heating element during the thawing of the additive. This thereby advantageously minimizes the risk of a system failure at low temperatures.

Additional preferred embodiments of the invention provide that the liquid additive is fed into the fuel line or the exhaust pipe by means of a blockable feed line, for which the pump at least temporarily generates a feed pressure in the feed line, in that the feed line branches off between the receptacle and the storage tank from the connection line, and the pump is installed in the receptacle or between the receptacle and the branching-off of the feed line into the connection line, and in that the shut-off element of the connection line is installed in the storage tank or between the storage tank and the branching-off of the feed line.

This has the advantage that the feed line as well as the receptacle can be charged from the storage tank by way of the connection line by means of the pump. The connection line, acting as a flow line, leads from the receptacle to the storage tank and can be connected there, for example, by means of a T joint, to a solenoid valve, as a further shut-off valve, and to the feed line. The filling of the receptacle from the storage tank takes place, for example, in the control device afterrun. For this purpose, the delivery direction of the pump is reversed and the solenoid valve at the storage tank is opened while the feed line is closed by the injection valve. When the level sensor detects that the receptacle is filled, the solenoid valve will be closed and the injection valve will be opened in order to evacuate the pipe by suction.

In the case of an advantageous embodiment of the invention, the delivery direction of the pump can be reversed. This also simplifies the construction of the arrangement. In this case, by way of a control device, the functions of, on the one hand, the feeding of additive from the receptacle by way of the injection valve into the fuel line or the exhaust pipe of the internal-combustion engine and, on the other hand, the filling of the receptacle from the storage tank can advantageously be controlled by changing the rotating direction of the pump.

Another advantageous embodiment of the invention provides that the blockable lines can be shut off by use of shut-off valves, particularly solenoid valves. Likewise, in a manner controlled by the control device, it thereby becomes easily possible to open or close the lines required for the respective operating situation.

Further preferred embodiments of the invention provide that the receptacle as well as the storage tank has at least one closable, in particular, manually closable and/or self-closing refill opening. As a result, different approaches advantageously remain possible for carrying out the required filling tasks. Mainly when the, in particular, self-closing refill opening is constructed as a coupling device for the connection with a filling device, and when a level measuring device for the additive is present in the receptacle, the construction of the arrangement described in the following may be achieved.

The storage tank for the additive is not accommodated in the engine compartment, but rather in a luggage compartment, cargo space, or under the trunk (such as in place of or in a spare wheel well), and cannot be heated. It has a volume of between 16 and 35 liters in order to, in each case, have to be refilled only in the servicing interval when visiting the shop. It therefore has a self-closing refill opening constructed as a coupling device for a filling device. Thus, a stationary filling by way of a refueling hose advantageously becomes possible, where the additive is fed in a manner closed off from the environment. A suction device, a level measuring or switch-off device, and additional devices may be used, similar to the state of the art of refueling systems for fuels. When the motor vehicle is in use, the driver usually does not have to pay any attention to the storage tank or it does not manifest itself to the driver.

In contrast, the receptacle for the additive is accommodated in the engine compartment and is connected with the storage tank by way of the connection line. It has a refill opening which is to be operated manually and has a screw cap. Such a filling possibility suitable for customers on the receptacle, which is relatively small in comparison with the storage tank, is simple, can be provided without changing the body shell, and is necessary, for example, in the event that the additive in the storage tank freezes and the receptacle can therefore no longer be filled from the storage tank by way of the pump. In this case, a level measuring device for the additive present in the receptacle indicates that a refilling of the receptacle, for example, by the driver, is appropriate.

This also applies to a further preferred embodiment of the invention, which provides that the receptacle is accommodated in the engine compartment, and the storage tank is not accommodated in the engine compartment, but rather in a luggage compartment or cargo space or in a spare wheel well.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a schematic view of an arrangement for feeding a liquid additive from a receptacle into a fuel line or into an exhaust pipe of an internal-combustion engine of a motor vehicle.

DETAILED DESCRIPTION OF THE DRAWING

The FIGURE illustrates an arrangement for feeding a urea solution known by the name AddBlue as a liquid additive from a receptacle 1 into an exhaust pipe 2 of a diesel engine, which is not shown, of a motor vehicle. A feed line 4, which can be closed by a shut-off valve 3, leads by way of an injection valve 5 into the exhaust pipe 2. As an alternative, the injection valve 5 may also take over the function of the shut-off valve 3, the latter then no longer being necessary.

The receptacle 1 is accommodated in the engine compartment and has a refill opening 7, which can be manually opened and closed by a screw cap 6; it also has a level measuring device 8 for the additive and a heating device 9 for heating at least a partial volume of the additive. In the proximity of the heating device 9 in the bottom area of the receptacle 1, a connection line 10 leads into the receptacle 1. The latter connects a storage tank 11 for the additive that is mounted below the trunk, instead of the spare wheel well, with the receptacle 1 and can also be closed by way of an additional shut-off valve 12. In addition, a return line 14, which can be blocked by way of an additional shut-off valve 13 and leads into the receptacle 1, branches off the connection line 10, and a pump 15 is also installed into the connection line 10 between the branching-off of the return line 14 and the receptacle 1, the delivery direction of the pump 15 being reversible.

When the additional shut-off valve 12 closes the connection line 10 in front of the storage tank 11 and the additional shut-off valve 13 closes the return line 14, the pump 15 can generate a feed pressure in the feed line 4 which, when the shut-off valve 3 is open, permits the injection of additive into the exhaust pipe 2 by way of the injection valve 5. By use of a control device, which is not shown and may also be the engine control device, the pump 15, the shut-off valves 3, 12, 13 and the heating device 9 are controlled as a function of sensor signals, operating conditions, and defaults.

When the rotational direction of the pump 15 is reversed, the connection line 10 to the storage tank 11 is opened by opening the additional shut-off valve 12, and the shut-off valve 3 and the additional shut-off valve 13 are closed, in which case the receptacle 1 is filled from the storage tank 11 by way of the connection line 10 with additive until the control device terminates the filling operation as a result of a signal of the level measuring device 8.

The storage tank 11 has a self-closing refill opening 16, which is constructed as a coupling device for the connection with a filling device (not shown). As a result, this storage tank 11 can reliably be filled up during servicing in the shop.

When the additive freezes because the ambient temperatures are too low, a thawing process can be initiated by way of the control device. For this purpose, the additional shut-off valve 12 will close the connection line 10 in front of the storage tank 11, and the shut-off valve 3 will close the feeding line 4. The opened additional shut-off valve 13 allows the pump 15 to remove additive thawed by the heating device 9 and to pump it back by way of the return line 14. Since the return line 14 ends at the top in the receptacle 1, the additive pumped back into the receptacle 1 flows over the frozen additive there and further thaws the latter. When the receptacle 1 is empty and additive in the storage tank 11 is frozen, a continued operation of the arrangement will be made possible in that the receptacle 1 can be refilled manually with additive by way of the refill opening 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for feeding a liquid additive from a receptacle into one of a fuel line and exhaust pipe of an internal-combustion engine of a motor vehicle, the receptacle being fillable with additive from a larger storage tank accommodated in the motor vehicle via a connection line blockable by a shut-off element, the arrangement comprising:

a pump operatively arranged in one of the receptacle or the connection line, the pump operating in a first direction to feed the liquid additive from the receptacle into said one of the fuel line and exhaust pipe, and the pump further operable in a second direction to feed the liquid additive from the larger storage tank into the receptacle;

a heating device operatively arranged for heating at least a partial volume of the additive present in an area of the receptacle in proximity to the heating device;

a closeable return flow line operatively arranged to branch-off of the connection line between the pump and the shut-off element, the return flow line being coupled into the receptacle and configured to recirculate at least the partial volume of the additive present in the area of the receptacle in proximity to the heating device to an area of the receptacle that is not in proximity to the heating device; and a blockable feed line by which the liquid additive is fed into said one of the fuel line and exhaust pipe, wherein the feed line branches-off of the connection line between the receptacle and the storage tank.

2. The arrangement according to claim 1, wherein the connection line is operatively arranged to end at one end in the area of the receptacle in proximity to the heating device.

3. The arrangement according to claim 2, wherein the one end ends in a bottom area of the receptacle in proximity to the heating device.

4. The arrangement according to claim 1, wherein the return flow line ends at one end in an upper area in the receptacle.

5. The arrangement according to claim 2, wherein the return flow line ends at one end in an upper area in the receptacle.

6. The arrangement according to claim 1,
wherein the pump at least temporarily generates a feed pressure in the feed line, and the pump being operatively arranged in the receptacle or between the receptacle and the branching-off of the feed line into the connection line; and
wherein the shut-off element of the connection line is installed in the storage tank or between the storage tank and the branching-off of the feed line.

7. The arrangement according to claim 2,
wherein the pump at least temporarily generates a feed pressure in the feed line, and the pump being operatively arranged in the receptacle or between the receptacle and the branching-off of the feed line into the connection line; and
wherein the shut-off element of the connection line is installed in the storage tank or between the storage tank and the branching-off of the feed line.

8. The arrangement according to claim 4,
wherein the pump at least temporarily generates a feed pressure in the feed line, and the pump being operatively arranged in the receptacle or between the receptacle and the branching-off of the feed line into the connection line; and
wherein the shut-off element of the connection line is installed in the storage tank or between the storage tank and the branching-off of the feed line.

9. The arrangement according to claim 1, wherein the blockable or closeable lines are blockable or closeable via shut-off valves.

10. The arrangement according to claim 1, further comprising a level measuring device for the additive, the level measuring device being operatively configured to measure a level of the additive in the receptacle.

11. The arrangement according to claim 1, further comprising at least one closeable refill opening for the receptacle and at least one closeable refill opening for the storage tank.

12. The arrangement according to claim 11, wherein the refill opening for the receptacle and the refill opening for the storage tank are each at least one of manually closeable and self-closing.

13. The arrangement according to claim 11, wherein the refill opening for the storage tank is constructed as a coupling device for connection with a filling device.

14. The arrangement according to claim 1, wherein the receptacle is operatively arranged in an engine compartment, and wherein the storage tank is not arranged in the engine compartment but in one of a luggage compartment, cargo space, and spare wheel well of the motor vehicle.

* * * * *